United States Patent
Dragon et al.

(10) Patent No.: US 6,790,498 B2
(45) Date of Patent: Sep. 14, 2004

(54) JOINED PROFILE SECTIONS

(75) Inventors: Horst Dragon, Moenchengladbach (DE); Hubert Wittig, Viersen (DE)

(73) Assignee: GenCorp Property, Inc., Sacramento, CA (US)

( * ) Notice: Subject to any disclaimer, the term of this patent is extended or adjusted under 35 U.S.C. 154(b) by 0 days.

(21) Appl. No.: 10/275,778

(22) PCT Filed: Apr. 10, 2001

(86) PCT No.: PCT/IB01/00596

§ 371 (c)(1),
(2), (4) Date: Apr. 22, 2003

(87) PCT Pub. No.: WO01/89811

PCT Pub. Date: Nov. 29, 2001

(65) Prior Publication Data

US 2003/0155341 A1 Aug. 21, 2003

(30) Foreign Application Priority Data

May 24, 2000 (GB) .............................................. 0012652
Nov. 16, 2000 (GB) .............................................. 0027981

(51) Int. Cl.[7] .............................................. B32B 1/08
(52) U.S. Cl. ........................................ 428/36.9; 428/58
(58) Field of Search ........................... 428/58, 61, 36.9; 156/304.02, 304.3

(56) References Cited

U.S. PATENT DOCUMENTS

| | | |
|---|---|---|
| 3,400,030 A | 9/1968 | Burger |
| 3,885,074 A | 5/1975 | Chandler |
| 4,734,324 A | 3/1988 | Hill |
| 6,447,865 B1 * | 9/2002 | Flick et al. .................... 428/52 |

FOREIGN PATENT DOCUMENTS

| | | |
|---|---|---|
| DE | 3012387 | 10/1981 |
| DE | 3906278 | 8/1990 |
| EP | 0665261 | 12/1994 |
| FR | 1048237 | 12/1953 |
| JP | 5707769 | 4/1982 |
| JP | 59145272 | 8/1984 |
| WO | WO 95/25629 | 9/1995 |

* cited by examiner

Primary Examiner—Alexander S. Thomas
(74) Attorney, Agent, or Firm—Leydig Voit & Mayer, Ltd.

(57) ABSTRACT

Two profile sections (5,6), such as two sealing, trimming or finishing strips for use in motor vehicle body construction, are joined together end to end by use of a heat-sensitive foil (24) such as made of thermoplastics material. The profile sections (5, 6) are clamped in respective retaining devices (18, 20) and the foil (24) is unwound from a roll (22) into position between the facing ends of the profile sections. Heaters (26, 28) are moved into position for heating the foil (24) and the ends of the profile sections and are then withdrawn. The two retaining devices (18, 20) are then moved towards each other so as to move the ends of the two profile sections into contact with opposite sides of the heated foil (24) which thus heat-bonds the end of the profile sections together. The foil (24) is provided with a plurality of through slits (24A) (or is in some other way rendered air-permeable) so that air can pass from one profile section to the other, through the bonded foil (24), in use of the joined profile sections (e.g. when they are fitted in position or when they are partially compressed to carry out a sealing function), thus preventing pressure build-up and possible bursting of the joint.

9 Claims, 4 Drawing Sheets

JOINED PROFILE SECTIONS

The invention relates to joined profile sections and to apparatus, methods and material for joining profile sections. More specifically, for example, it relates to the joining of two ends of sealing, trimming and finishing strip such as to produce an endless loop, ready for installation onto, for example, the door frame of a vehicle body.

Known methods for joining profile sections are shown in DE 3906278, which shows a method and apparatus for joining sections by clamping the sections in retaining means, placing a connecting foil on the cut ends of the sections to be joined, heating the ends and pressing the ends together to form the joint. U.S. Pat. No. 3,400,030 shows a method for butt splicing the ends of elongated rubber articles by clamping the ends in retaining means, applying a layer of adhesive to the ends by means of a paddle and pressing the ends together, heat being applied to the ends through the retaining means.

According to the invention, there is provided a joined profile section arrangement, comprising two strip lengths joined end to end by sheet-shaped heat-bonding connecting material between and bonded to the ends, the connecting material being adapted to permit the passage therethrough of air.

According to the invention, there is also provided foil-like material for connecting two profile sections together end to end, comprising a heat-sensitive foil which bonds to the two ends when placed between them and in response to the application of heat, the foil being adapted to allow the passage of air therethrough.

According to the invention there is further provided apparatus for joining two strip lengths end to end, comprising means for clamping the two strip lengths with their ends facing towards each other, means for positioning heat-responsive connecting material between the ends of the profile section when the said ends are spaced apart from each other, heating means for heating the connecting material and the ends of the profile sections, and transporting means for moving the profile sections towards each other so that the heated ends make contact with the heated connecting material whereby the connecting material bonds the ends of the profile sections together, the connecting material allowing the passage of air therethrough between the bonded ends of the profile sections.

According to the invention, there is still further provided a method of forming a joint between respective ends of two profile sections, comprising the steps of holding the profile sections, positioning heat-responsive connecting material between the ends of the profile sections, heating the connecting material and the ends of the profile sections, and moving the profile sections towards each other so that the heated ends make contact with the heated connecting material whereby the connecting material bonds the ends of the profile sections together, the connecting material allowing the passage of air therethrough between the bonded ends of the profile sections.

Apparatus and methods according to the invention for forming a joint between two profile sections, two profile sections so joined and embodying the invention, and material for use in connecting two profile sections and embodying the invention, will now be described, by way of example only, with reference to the accompanying diagrammatic drawings in which.

Figure 1:
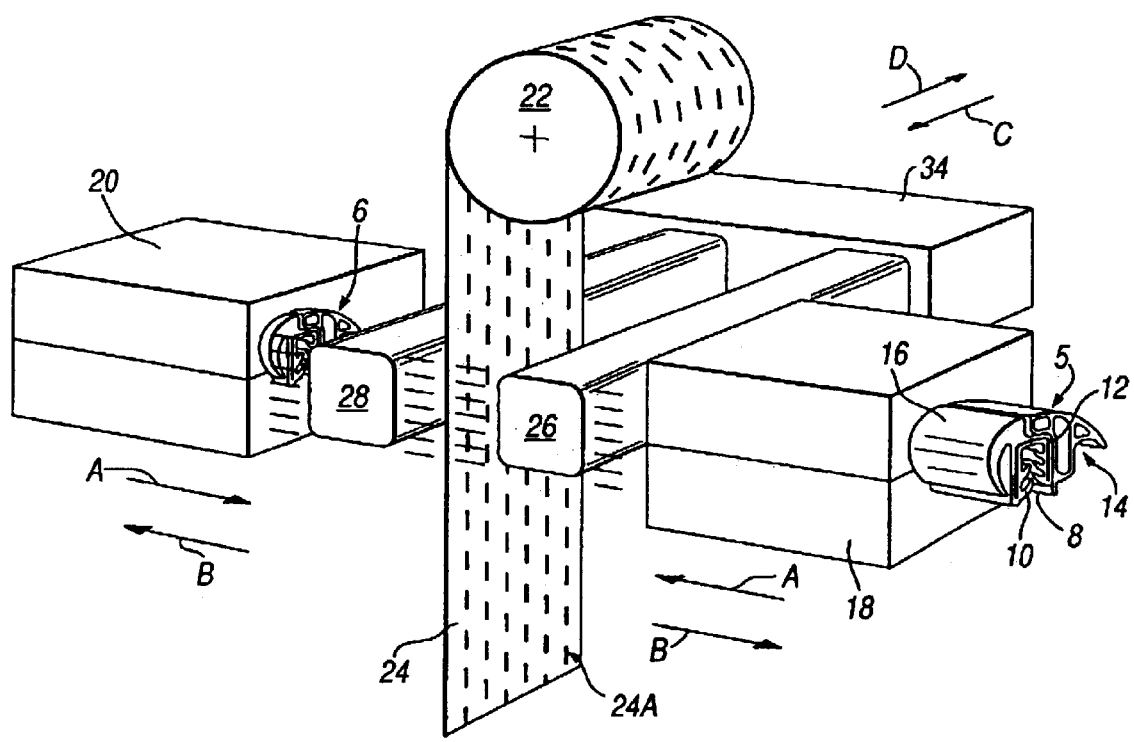
FIG. 1 is a perspective view of one form of the apparatus.

In the apparatus shown in FIG. 1, the two profile sections 5,6 to be joined are in the form of sealing, trimming or finishing strips for use in motor vehicle body construction and, more particularly, for forming seals around door openings. Each profile section comprises extruded plastics or rubber or similar material defining a channel 8 (the channel of the profile section 6 is not easily visible in FIG. 1) which, in use, embracingly grips a frame of the door opening such as formed by a flange surrounding the opening where the inner and outer body panels of the vehicle are joined together. The extruded material preferably defines integral gripping lips 10 extending across the interior of the channel 8 from the opposite facing walls thereof, these lips frictionally contacting the frame or flange in use to help to secure the strip in position thereon. The extruded material defining the channel 8 may be reinforced with a channel-shaped embedded resilient core or carrier 12 such as made of metal. As shown in FIG. 1, the sealing strip carries a relatively soft sealing part 14 extending from the outside of one side wall of the channel 8. When the sealing strip is mounted on the frame or flange of the door opening, this sealing part 8 is positioned so as to be partially compressed by the closing door, thus providing a weatherseal around the door opening. A so-called "cosmetic lip" 16 extends over the outside of the opposite side wall of the channel 8 for receiving and hiding the edge of a trim panel on the interior of the vehicle body.

Referring in more detail to FIG. 1, the apparatus comprises two retaining devices 18,20 for receiving and clamping the profile sections 5,6. The retaining devices 18,20 can be opened to receive the profile sections 5,6 and then closed to clamp the profile sections in position. The retaining devices 18,20 are mounted on slides or similar mechanism (not shown) so as to be slidable in the directions of the arrows A and B to bring the ends of the clamped profile sections 5,6 towards and away from each other. A roll 22 of a thermoplastic foil or film is mounted between and above the two retaining devices 18,20 by supporting means (not shown). The foil can be drawn off the roll 22 as shown at 24.

On each side of the path of the foil 24 a respective heater 26,28 is positioned, the two heaters 26,28 being mounted on a transporting unit 34, the transporting unit 34 being movable to and fro in the directions of the arrows C and D so that the heaters 26,28 can be moved in the direction C into the position shown in FIG. 1 and moved in the direction D so that they are clear of the space between the two retaining devices 18,20.

The foil 24 may be made from a polyolefin material or other suitable thermoplastic material.

In use, the two profile sections 5,6, the ends of which are to be joined, are clamped in the retaining devices 18 and 20 so that the ends to be joined protrude towards each other from the retaining devices. A length of the foil 24 is unwound from the roll 22, generally into the position shown in FIG. 1 The transporting unit 34 is moved in the direction of the arrow C so as to bring the heaters 26,28 into the positions shown in the Figure. The heaters are then activated. The heaters 26,28 cause heating of the ends of the profile sections 5 and 6 and the foil 24.

Figure 2:
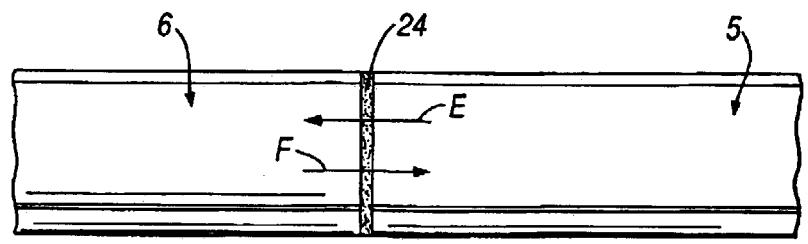
FIG. 2 is a cross-section through two profile sections joined by the apparatus of FIG. 1.

The transporting unit 34 is then withdrawn in the direction D so that the heaters 26,28 are clear of the spaces between the retaining devices 18,20 and the foil 24. The retaining devices 18,20 are then caused to move towards each other so as to bring the ends of the profile sections 5,6 into contact with opposite sides of the foil 24 with a predetermined amount of pressure. The heated foil 24 thus thermally bonds the two ends of the profile sections 5 and 6 firmly together, as shown in FIG. 2. The retaining devices 18,20 are then opened to release the joined profile sections.

In accordance with an important feature, the foil 24 is provided with through slits 24A. These slits ensure that, in the finished joint, air can pass from one side of the foil to the other as shown by the arrows E and F in FIG. 2. Therefore, the slits 24A prevent a build-up in pressure across the foil 24 in the event of compression of the strips 5,6. Such compression may take place during fitting of the strips onto the vehicle body and/or in use when the strips are compressed by the closing door and is especially possible when the strips have hollow enclosed interiors. Any such build-up in pressure could tend to cause bursting of the foil and rupture of the joint. The slits 24A eliminate this risk by allowing air to pass from one side of the foil to the other.

It will be appreciated that the slits 24A could be replaced by slots or other holes, apertures or cut-outs. Instead, the foil could be rendered air or gas-permeable in some other way.

The foil 24 may be of any suitable type for ensuring an effective bond, taking into account the material and characteristics of the profile sections. It may, for example, have a melting point between 120 and 130° C. The apparatus and method described can provide a very quick curing joint (in four to five seconds) and which is immediately capable of withstanding loads. The need for vulcanisation is avoided.

Figure 3:
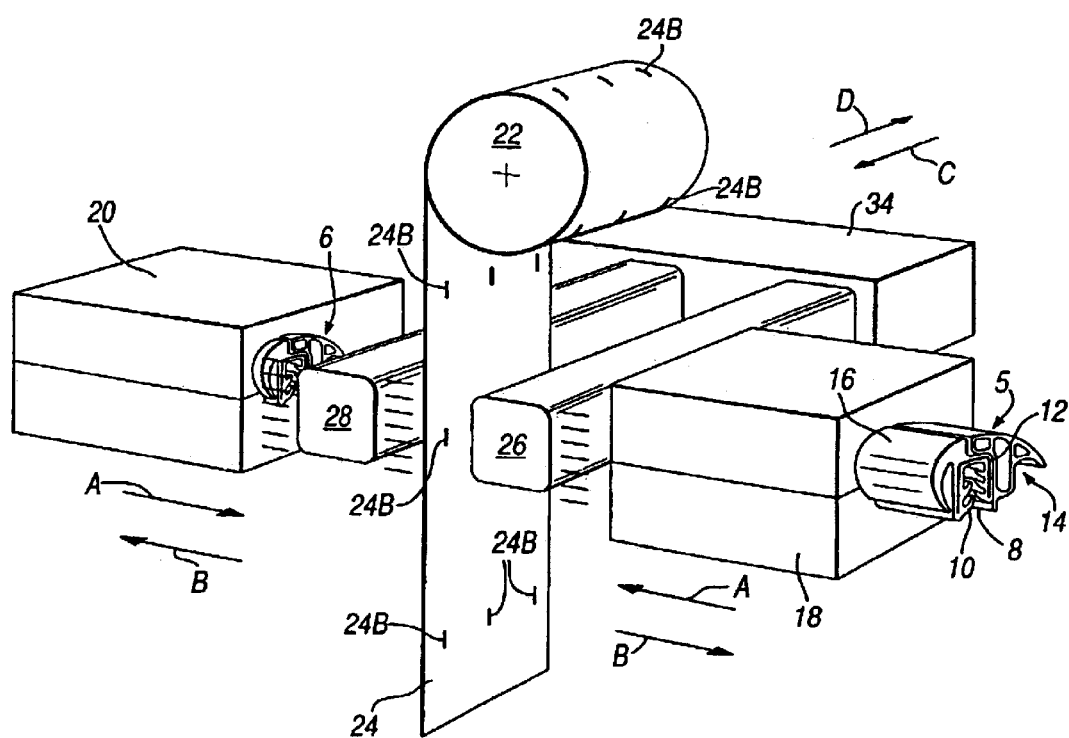
FIG. 3 is a perspective view of another form of the apparatus.

FIG. 3 shows a modification to the apparatus of FIG. 1. In the apparatus of FIG. 3, the foil 24 is not provided with slits 24A distributed at closely spaced positions over its entire length and surface. Instead, a small number of slits 24B are provided. As shown in FIG. 3, the slits 24B are positioned in groups of three (in this example), the groups being spaced from each other at predetermined intervals (preferably equal intervals) along the length of the coiled foil 24. In operation, the roll 22 is periodically indexed by a predetermined number of angular degrees so that the next group of three slits 24B becomes positioned between the heaters 26,28—so as to carry out the next bonding operation. It is not necessary, of course, for there to be three slits 24B in each group. There could be more or less numbers of such slits: for example, each group could in fact consist of one slit 24B, only.

In a modification, the groups of slits 24B of FIG. 3 could instead be groups of holes positioned at spaced-apart intervals. The holes could be circular or of any other suitable shape. Again, of course each "group" could consist of a single such hole or more than one.

In the embodiments so far described, the slits, 24A or 24B, or the holes, and the material of the foil 24, could be such that each such slit or hole becomes enlarged by the action of the heaters 26,28.

Figure 4:
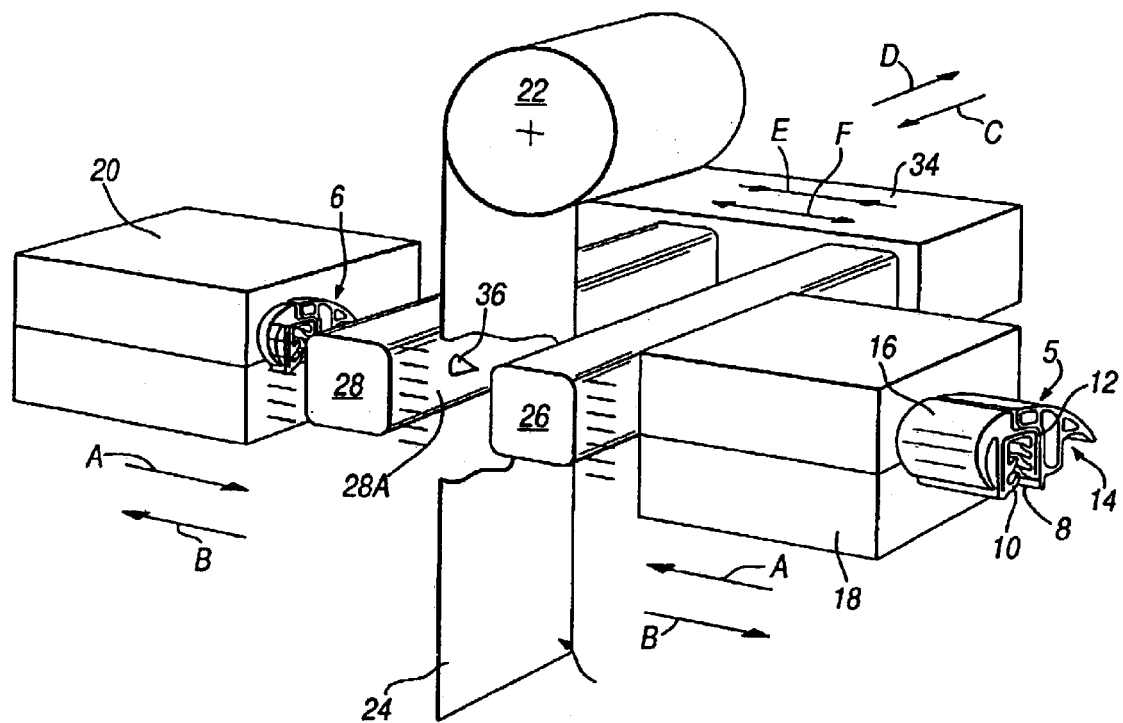
FIG. 4 is a perspective view of a further form of the apparatus.
Figure 5:
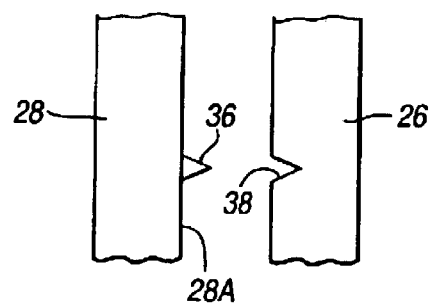
FIG. 5 is a scrap plan view of part of the apparatus of FIG. 4.

FIG. 4 shows a further modification in which the foil 24 on the roll 22 is not provided with any slits or holes. Instead, the heaters 26,28 are modified. Firstly, they are mounted on the unit 34 so as to be movable thereon bodily towards and away from each other in the directions of the arrows E and F. Secondly, and as shown in FIG. 4, where part of the foil 24 is cut away, a face 28A of the heater 28 (that is, the face opposing the foil 24) is provided with at least one hole-forming punch 36, which protrudes outwardly from the face 28A. The corresponding face (not visible in FIG. 4) of the heater 26 is provided with a matching recess 38; the punch 36 and the recess 38 are shown in FIG. 5 which is a plan view of part of the heaters 26,28.

In use, the two profile sections 5,6 are clamped in position in the retaining devices 18,20 as already explained. A length of the unapertured foil 24 is unwound from the roll 22, and the transporting unit 34 moves the heaters 26,28 into the position shown in FIG. 4.

The heaters are now moved towards each other as shown by the arrows E, so that the punch 36 and the corresponding recess 38 move towards each other, the punch 36 entering the recess 38 and thus punching a hole through the foil 24. The heaters are then activated to provide the necessary heat to the foil, either when they are in contact with the foil or after they have been moved back, in the directions of the arrows F, to the position shown in FIG. 4. Further operation is then as described with reference to FIG. 1.

Figure 6:
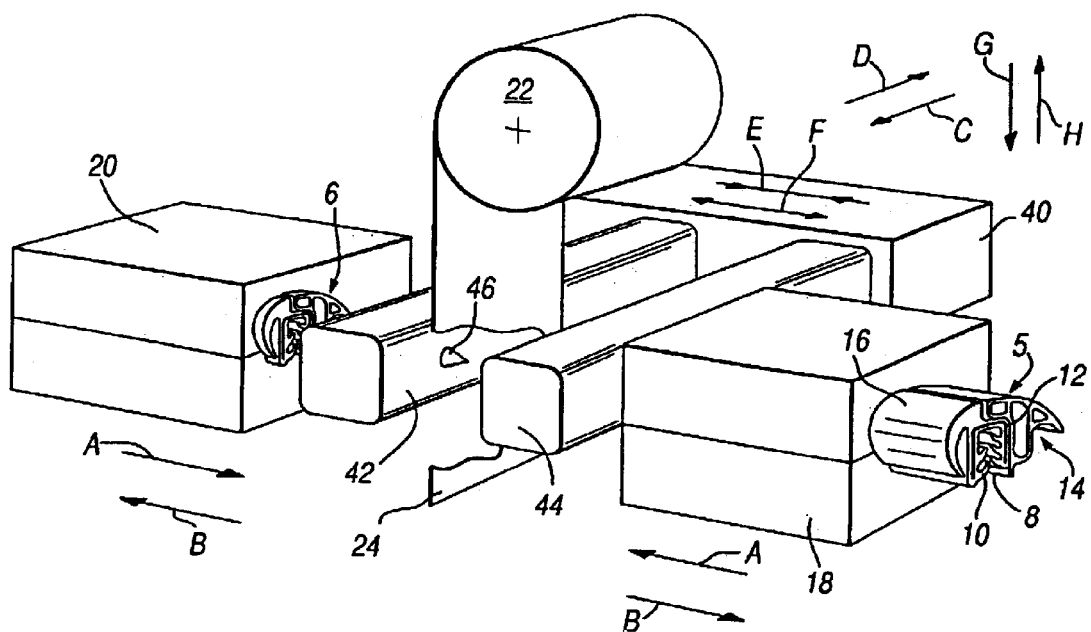
FIG. 6 is a perspective view of yet another form of the apparatus.
Figure 7:
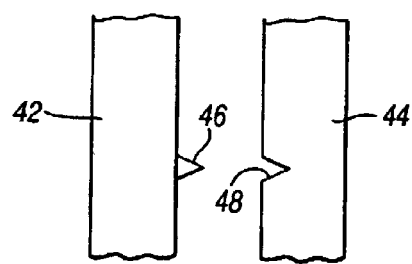
FIG. 7 is a scrap plan view of part of the apparatus of FIG. 6.

In a further modification shown in FIGS. 6 and 7, a separate feed unit 40 is provided, in addition to the transporting unit 34 and the heaters 26,28 (in FIG. 6, the transporting unit 34 and the heaters 26,28 are not shown). The separate unit 40 carries two punch support members 42,44 each shaped similarly to the heaters 26,28 and respectively carrying one or more punches 46 similar to the punch 36 and one or more recesses 48 (FIG. 7) similar to the recess 38. In operation, the unit 34 with the heaters 26,28 is initially held clear of the foil 24, and the separate unit 40 is moved into the position, shown in FIG. 6, being moved in the directions of the arrows G and C by a mechanical drive unit not shown, thus positioning the punch support members 42,44 on each side of the foil 24. The punch support members 42,44 are then moved towards each other in the directions of the arrows E,F to punch one or more slits, holes or apertures in the foil. The separate unit 40 is then removed (in the direction of the arrows D and H) so as to be clear of the foil 24. This allows the unit 34 with its heaters 26,28 to be moved into position (into the position shown in FIG. 4) to heat the foil in the manner already explained and to allow bonding to take place.

The arrangements of FIGS. 4 and 6 have the advantage that plain foil 24 can be used, without any slits or holes or other apertures, these being formed in situ by the punch 36 and recess 38 and the movement of the heaters 26,28 (FIGS. 4 and 5) or by the punch 46 and the movement of the punch support.

Clearly, there can be more than one punch 36 and one matching recess 38, or more than one punch 46 and matching recess 48, so as to produce a required plurality of slits, holes or other apertures.

The punching action, to form the slits, holes or other apertures in the foil, can take place before or after the heating action.

As described with reference to FIG. 4 and FIG. 6, the holes or other apertures are formed in the foil 24 by a mechanical punching operation performed by the punch 36 or 44 in combination with the recess 38 or 48. Instead, however, the holes or other apertures could be formed by other suitable non-mechanical means such as by a jet of air or gas or by an electrical spark arrangement for example, such other means being carried by one or both of the heaters 26,28 in the case of the arrangement of FIG. 4 or by one or both of the punch support members 42,44 in the case of the arrangement of FIG. 6.

What is claimed is:

1. A joined profile section arrangement, comprising two strip lengths each defining a hollow passage extending therethrough each strip length having an end placed adjacent the corresponding end of the other strip length so that the strip lengths extend linearly in alignment with each other at least in the region of the adjacent ends, sheet-shaped heat-bonding connecting material placed between and bonded to said adjacent ends so as to be substantially perpendicular to the strip lengths in the region of said adjacent ends, the connecting material being adapted to permit the passage therethrough of air and thus the passage of air from the hollow passage of one said strip length to the hollow passage of the other said strip length.

2. The arrangement according to claim 1, wherein the connecting material is an air-permeable material.

3. The arrangement according to claim 1, wherein the connecting material is apertured.

4. The arrangement according to claim 3, wherein the connecting material is provided with a plurality of through slits.

5. The arrangement according to claim 1, wherein the connecting material is of foil configuration.

6. The arrangement according to claim 1, wherein the connecting material is a thermoplastic material.

7. A joined profile section arrangement, comprising two strip lengths joined end-to-end by sheet-shaped heat-bonding connecting material between and bonded to the ends, wherein the connecting material is adapted to permit the passage therethrough of air, said connecting material being apertured and provided with a plurality of through slits.

8. An arrangement according to claim 7, wherein the connecting material is of foil configuration.

9. An arrangement according to claim 7, wherein the connecting material is a thermoplastic material.

* * * * *